Patented Mar. 6, 1934

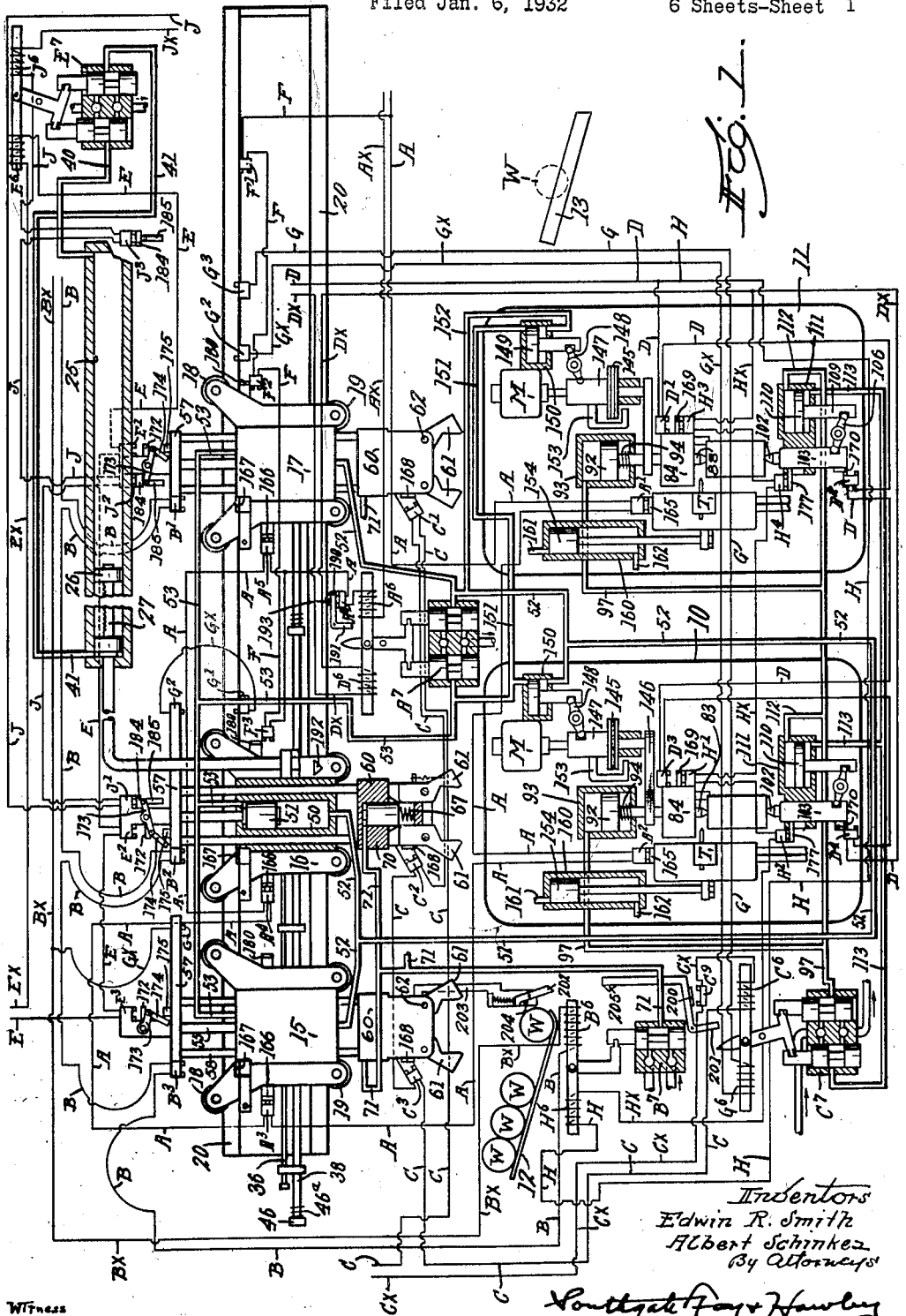

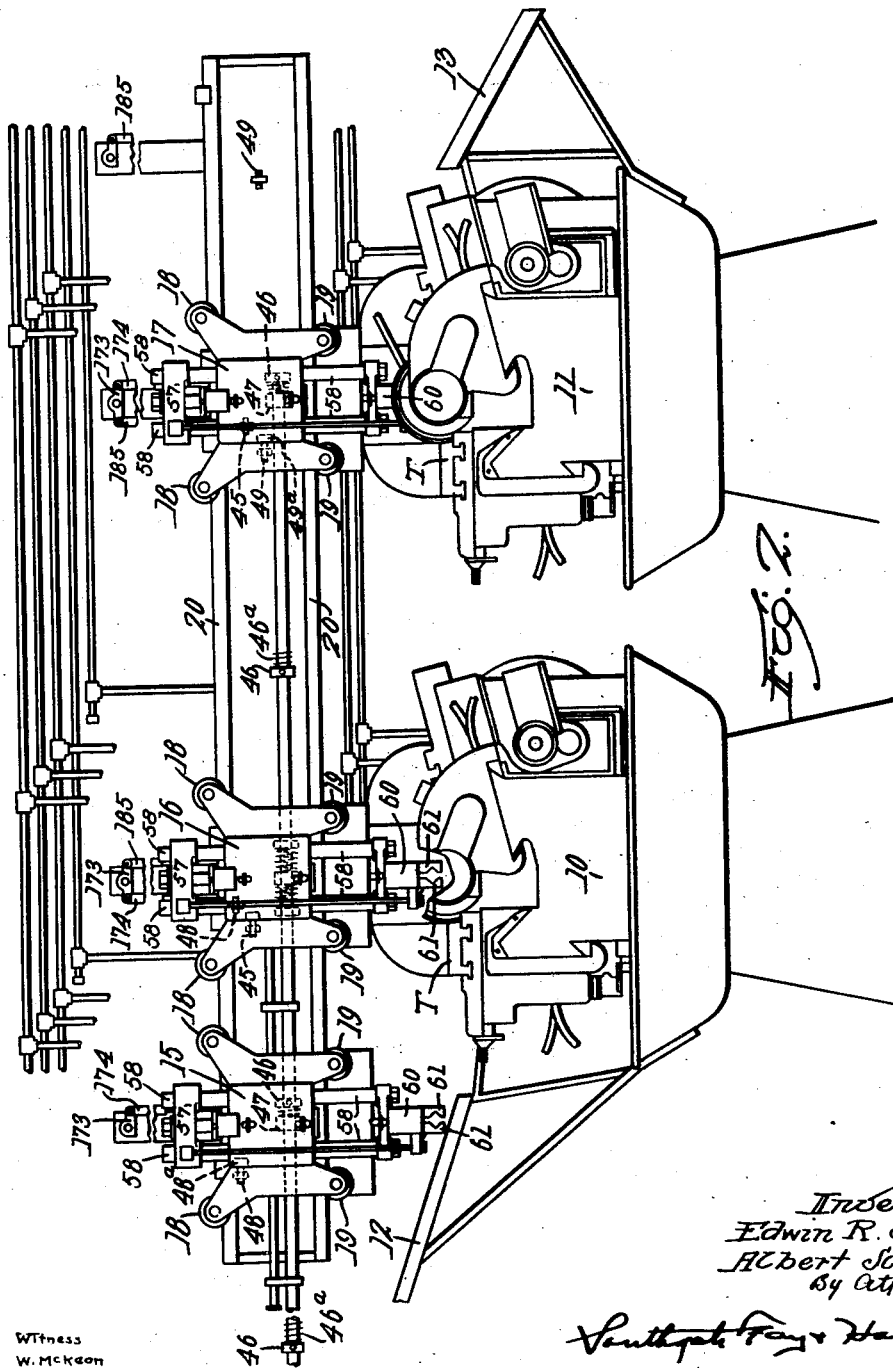

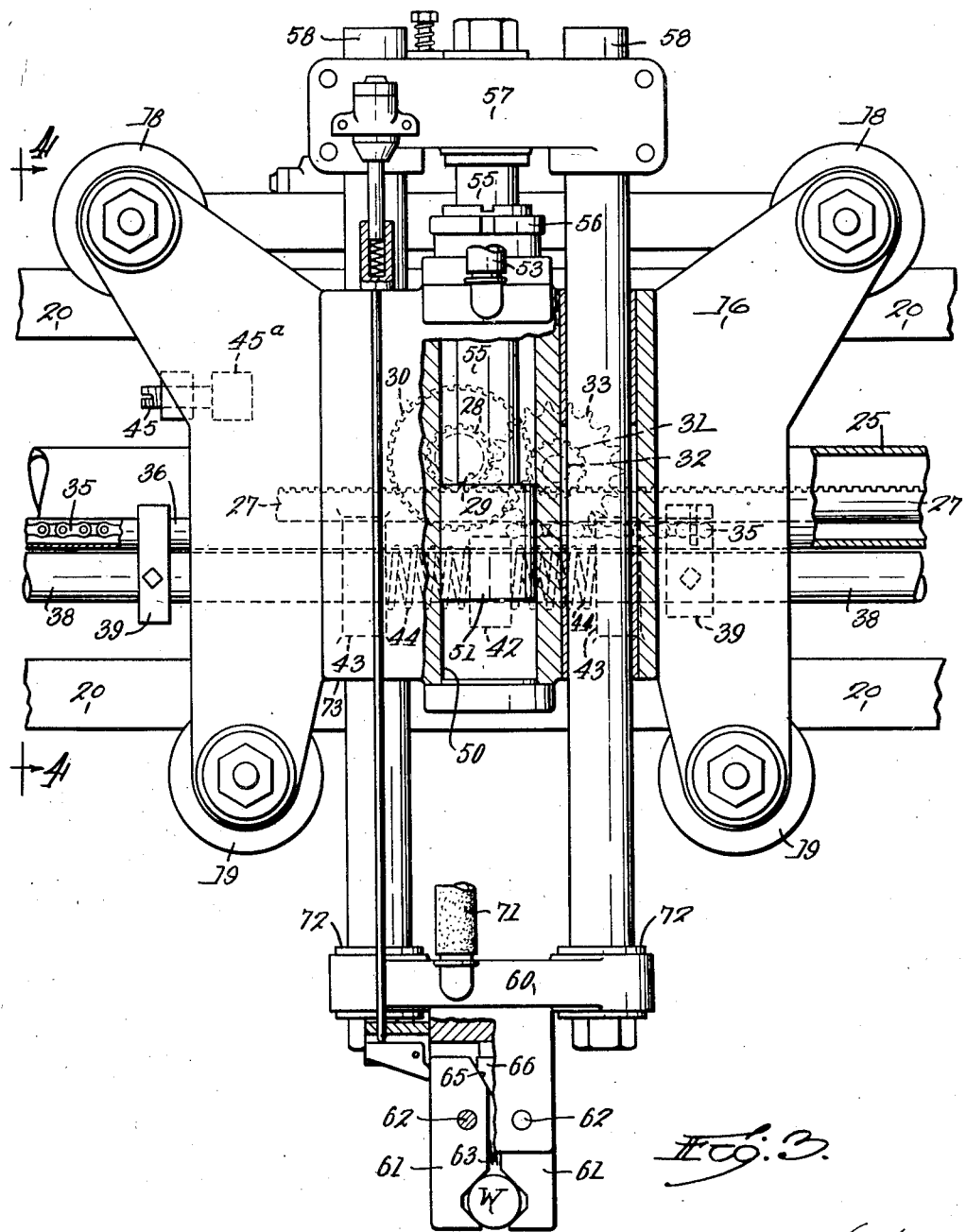

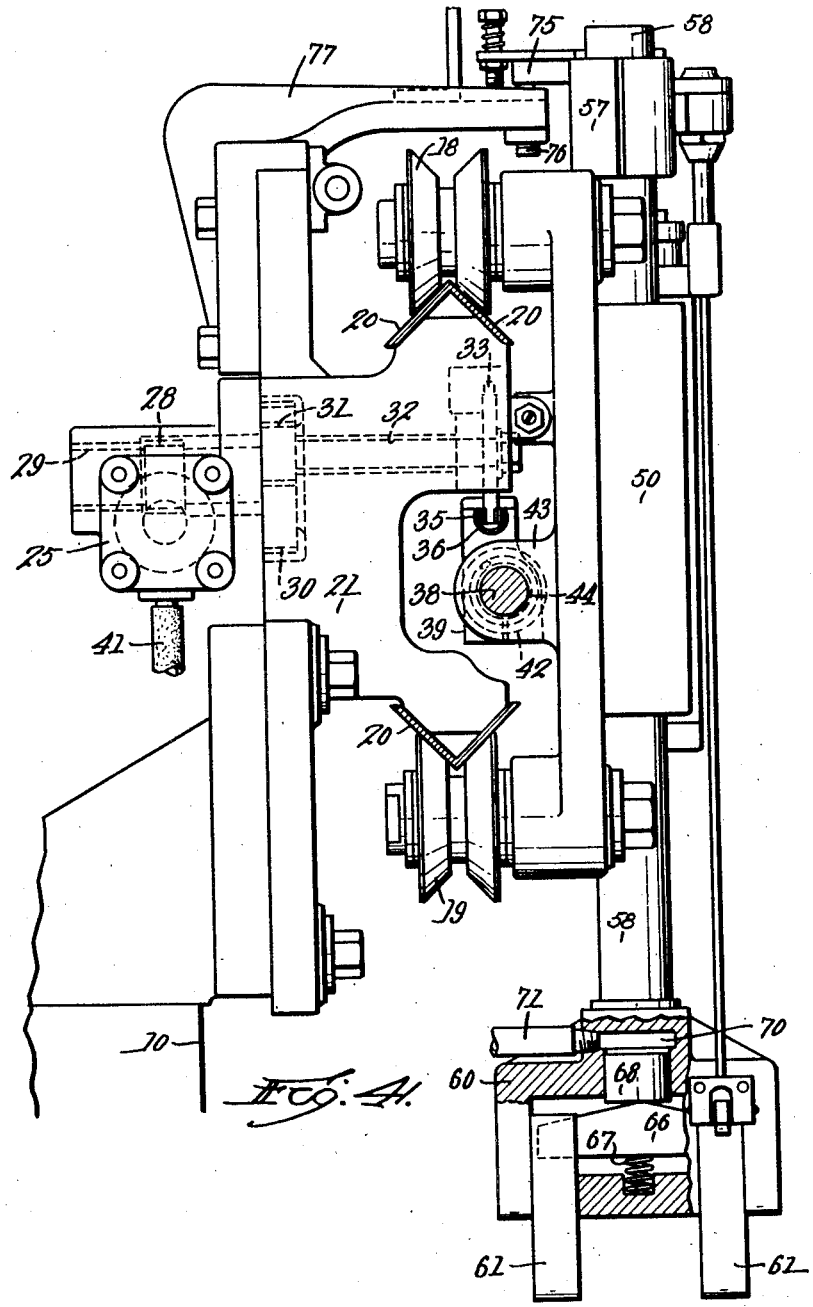

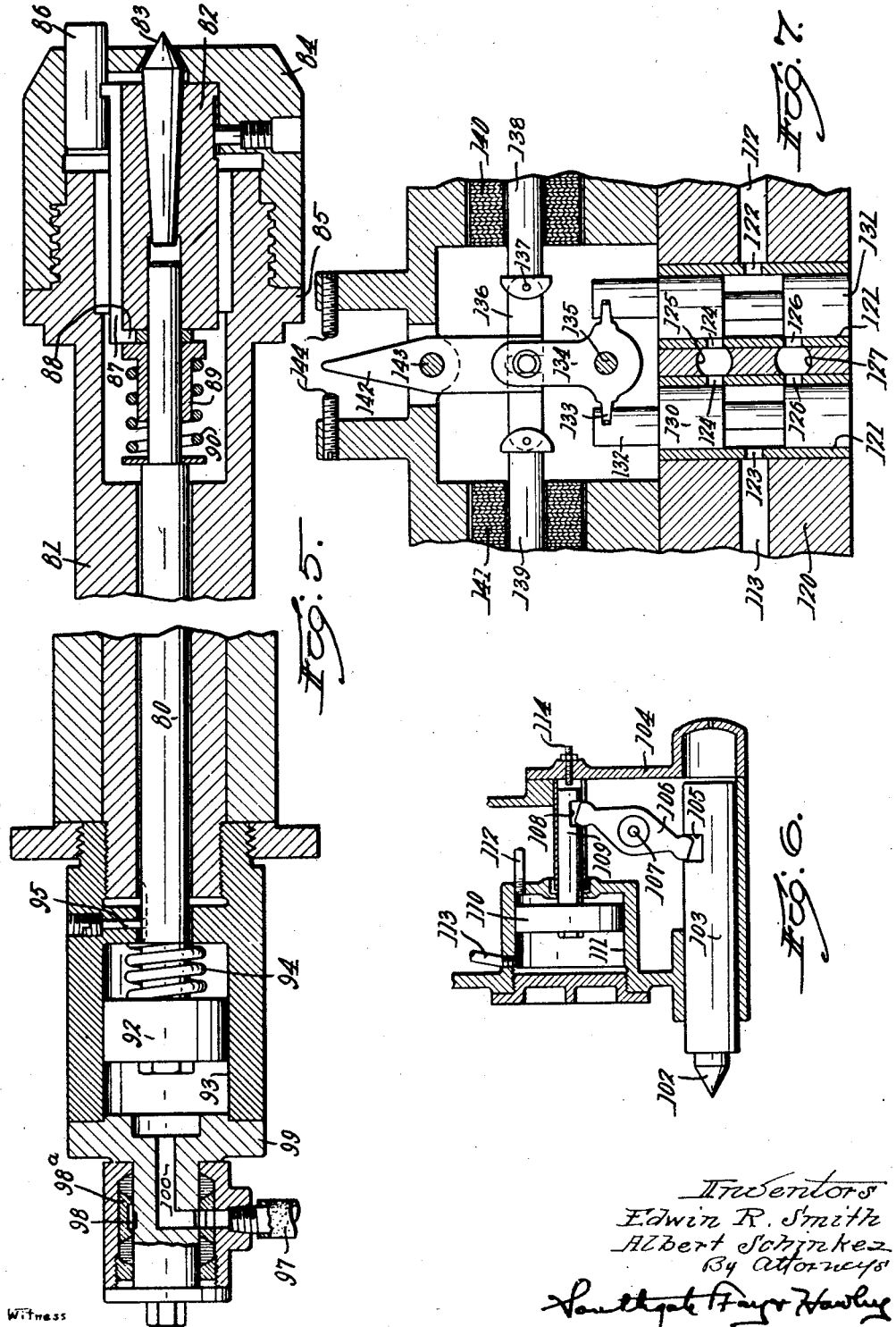

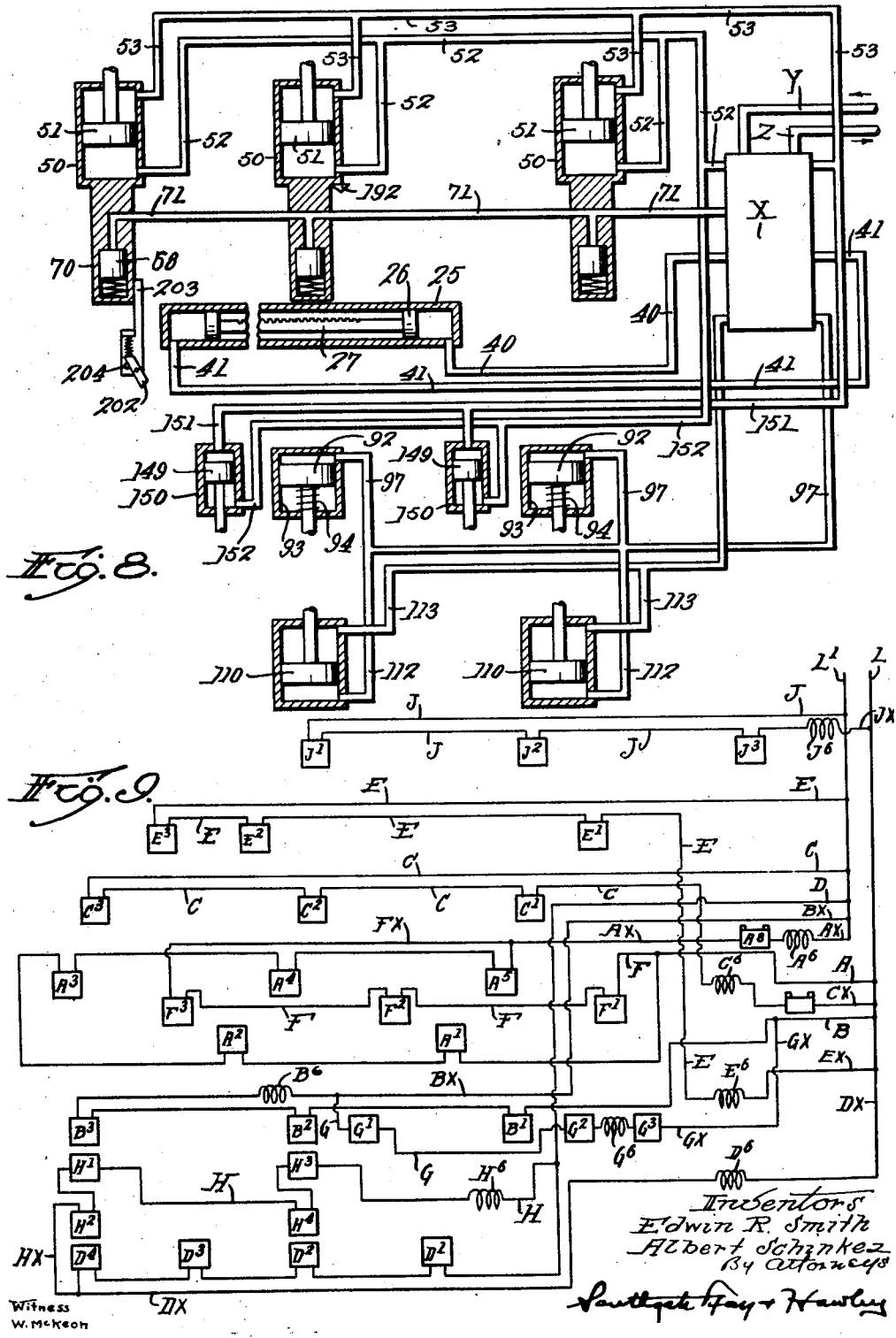

1,950,040

UNITED STATES PATENT OFFICE 1,950,040

WORK-HANDLING MECHANISM FOR MACHINE TOOLS

Edwin R. Smith and Albert Schinkez, Seneca Falls, N. Y., assignors to Seneca Falls Machine Company, Seneca Falls, N. Y., a corporation of Massachusetts Application January 6, 1932, Serial No. 585,088

12 Claims. (Cl. 82—2)

This invention relates to work-handling mechanism for machine tools such as lathes, grinders, centering machines, and the like.

It is the general object of our invention to provide work-handling mechanism so designed that pieces of work may be automatically advanced thereby through a series of operating positions, in each of which a different operation may be performed thereon.

A further object of our invention is to provide interlocking mechanism by which the movements of the work-handling mechanism may be so controlled that these movements must be performed in a predetermined sequence and that each movement will take place only after a certain definite procedure has been completed.

Other features of the invention relate to details of the work-handling and control mechanisms, and to arrangements and combinations of parts which will be hereinafter described and more particularly pointed out in the appended claims.

A preferred form of the invention is shown in the drawings, in which

Fig. 1 is a diagrammatic view showing the general relation of the various parts of the work-handling mechanism, and the control devices therefor;

Fig. 2 is a front elevation of the work-handling mechanism, shown mounted on two associated automatic lathes;

Fig. 3 is an enlarged front elevation of one of the work-handling heads;

Fig. 4 is a sectional side elevation of the head, taken substantially along the line 4—4 in Fig. 3;

Fig. 5 is a longitudinal sectional view of a work-driving spindle and certain actuating and control mechanism;

Fig. 6 is a longitudinal sectional elevation of a tail-stock, together with its actuating mechanism;

Fig. 7 is a sectional elevation of certain valve-operating mechanism to be described;

Fig. 8 is a diagrammatic view showing the connections for operation of our work-handling mechanism by fluid under pressure, and Fig. 9 is a diagrammatic view of certain electrical control connections.

Referring to Fig. 2, we have shown our improved work-handling mechanism applied to a pair of automatic lathes 10 and 11, located side by side and equipped to perform successive roughing and finishing operations on a piece of work.

The machine 10 is provided with a loading chute or runway 12, and the machine 11 is similarly provided with a discharge or delivery runway 13.

Three work-handling heads 15, 16 and 17 are shown, which heads are provided with upper rolls 18 and lower rolls 19 having grooved surfaces engaging fixed V-shaped guide-rails 20 (Fig. 4), carried by stands 21 supported on brackets 22 secured to the heads of the lathes 10 and 11.

The work-handling head 15 is used to transfer new blanks from the loading chute or runway 12 to the roughing machine 10. The work-head 16 is used for transferring a piece of partly-finished work from the roughing machine 10 to the finishing machine 11, and the work-head 17 is used for removing finished work from the machine 11 and depositing it on the discharge runway 13.

Work head moving mechanism

Provision is made for simultaneous movement of the work-heads along the rails or guide-ways 20, which provision in its preferred form, comprises a cylinder 25 (Figs. 4 and 8) mounted at the back of one of the fixed stands 21 and having a piston 26 slidable therein. The piston 26, as indicated in Fig. 8, is formed with two heads spaced widely apart and connected by a rod or bar 27 having rack teeth formed on its upper side.

The rack bar 27 engages a pinion 28 (Figs. 3 and 4) mounted on a shaft 29 having bearings in the casing or cylinder 25. The shaft 29 is provided with a gear 30 outside of the casing 25, which gear engages a pinion 31 on a shaft 32 extending forward as indicated in Fig. 4, and provided with a sprocket 33 at the front end thereof.

The sprocket 33 engages a sprocket chain 35 supported in a tube 36 which is open at its upper side to permit entrance of the sprocket 33. The tube 36 is mounted above a pull rod 38 and is secured thereto by a plurality of clamps 39. The ends of the chain are secured to certain of the clamps 39, so that the chain 35 and pull rod 38 are longitudinally movable as a unit.

Pipes 40 and 41 (Fig. 8) admit fluid under pressure to one end or the other of the cylinder 25, as may be indicated by the control mechanism to be described.

By reference to Fig. 2, it will be seen that the work-head 16 in transferring work between the machines 10 and 11 must move over a greater distance than is required for either of the other work-heads 16 or 17. Accordingly, the pull rod 38 is given sufficient motion to move the work-head 16 the desired distance, and provision is made for lost motion between the pull rod 38 and the work-heads 15 and 17.

A collar 42 (Figs. 3 and 4) on the pull rod 38 is positioned between lugs or projections 43 on the back of the head 16, and springs 44 are interposed between the collar 42 and the projections 43. Spaced stops 45 (Fig. 2) are provided on the fixed stands 21, which stops alternately engage an abutment 45a on the back side of the head 16 and limit the travel of the head 16 in each direction, thus causing the head to be exactly aligned vertically with the work centers of the spaced machines 10 and 11. The springs 44 are provided to permit a slight excess motion of the pull rod 38 and to avoid shock when the head 16 engages either one of the stops 45.

Additional collars 46 (Fig. 2) and associated springs 46a are provided on the pull rod 38 for the work-heads 15 and 17. These collars and springs are spaced apart and alternately engage opposite sides of a single projection 47 on each head 15 and 17. Adjustable stops 48 are alternately engaged by an abutment 48a on the back of the head 15 and stops 49 are alternately engaged by an abutment 49a on the back of the head 17. The stops 45, 48 and 49 are at different elevations so that each pair of stops will cooperate with one only of the abutments 45a, 48a and 49a on the backs of the heads 16, 15 and 17 respectively.

Work-head actuating mechanism

The work-heads 15, 16 and 17 are substantially identical in construction and a description of the work-head 16 will apply also to the work-heads 15 and 17.

Referring to Figs. 3 and 4, the work-head 16 contains a cylinder 50 within which a piston 51 is slidable. Fluid under pressure is admitted at the lower end of the cylinder 50 through a pipe 52 (Fig. 8), and to the upper end of the cylinder 50 through a pipe 53. Whenever pressure is applied through one of the pipes 52 or 53, the other pipe is simultaneously connected to the exhaust or atmosphere through mechanism to be described.

A piston rod 55 (Fig. 3) extends up through a stuffing box 56 at the upper end of the cylinder 50 and supports a cross-head 57. Parallel rods 58 are secured in the cross-head 57 and extend downward through vertical bearings in the head 16.

At their lower ends, the rods 58 support a gripper head 60. Gripper members 61 are pivoted at 62 in the head 60 and are normally separated by a coil spring 63. Two pairs of gripper members 61 may be provided, as indicated in Fig. 4, so that long work may be more securely held.

The gripper members 61 are provided with inclined cam faces 65 engaged by a wedge-shaped cross-bar 66 (Fig. 4). The bar 66 is loosely mounted and acts as an equalizing bar to uniformly distribute the gripping pressure. A coil spring 67 normally holds the cross-bar in raised position and also raises a piston 68 engaged thereby and slidable in a cylinder 70 in the gripper head. Fluid under pressure is admitted to the cylinder 70 through a pipe 71.

It will be understood that the pipes 52, 53 and 71 are flexibly connected, so as to permit longitudinal sliding movement of the work-heads.

The upward movement of the gripper heads 60 is limited by engagement of upper surfaces 72 (Fig. 3) of the gripper head with a lower surface 73 of the work-head.

Downward movement of the gripper head is limited by engagement of an arm or bracket 75 (Fig. 4) on the cross head 57 with the upper end of an adjusting screw 76, threaded in the end of a bracket 77 secured to a stand 21. It will be understood that additional stop screws 76 and brackets 77 are provided for each longitudinal working position of each of the work-heads.

Work-spindle and driver

In Fig. 5 we have shown a special form of work-spindle and driver, particularly adapted for use with our improved work-handling mechanism. A rod 80 is slidable axially in a work-spindle 81 and is provided at one end with an end member 82 in which the usual tapered work center 83 is seated. The center 83 extends out through an opening in the center of a cap 84, threaded on the end portion 85 of the spindle 81.

A driver 86 is slidably mounted in the cap 84 and is engaged by the offset end of a rod 87, slidable in a keyway in the member 82 and having an inwardly offset end 88, yieldingly held in outward position against the end of the member 82 by a collar 89 slidable on a reduced portion of the rod 80 and pressed outward by a spring 90.

Movement of the rod 80 will thus simultaneously advance or withdraw the center 83 and the driver 86, and will also permit the center only to be advanced when outward movement of the driver 86 is prevented.

A piston 92 is secured to the inner end of the rod 80 and is slidable in a cylinder 93 firmly secured to the end of the work-spindle 81 and rotatable therewith. A spring 94 acts to withdraw the center and driver when pressure in the cylinder 93 is relieved.

A stud 95 extends into a keyway in the rod 80 and prevents relative angular movement of the piston 92 in the cylinder 93. Fluid under pressure is admitted to the outer end of the cylinder 93 through a pipe 97 connected to an annular port 98 in a bearing member 98a loosely mounted on the outer end of the cylinder cap 99 and provided with gland packing at each side of said port. The annular port 98 is connected through a passage 100 to the cylinder 93.

The admission of pressure fluid to the cylinder 93 advances the center 83 and the driver 86 to operative position, while connection of the pipe 97 to the exhaust or atmosphere allows the center and the driver to be withdrawn by the spring 94.

Tail stock construction

A preferred construction of the tail-stock and tail-center operating mechanism is shown in Fig. 6, in which the tail-center 102 is mounted in a member 103 slidable in a bearing in the tail-stock 104 and having a notch or opening 105 which receives one end of a lever 106.

The lever 106 is pivoted at 107 and the upper end of the lever is received in a notch or opening 108 in a piston rod 109. The rod 109 is connected to a piston 110 in a cylinder 111 having pipes 112 and 113 for admission of fluid under pressure thereto.

When fluid is admitted through the pipe 113, the center 102 is advanced to operative position, which position may be determined by engagement of the end of the piston rod 109 with the inner end of a stop screw 114. The center 102 is withdrawn by admitting pressure fluid through the pipe 112.

*Valve mechanism*

In Fig. 7 we have illustrated a form of control valve mechanism by which the flow of fluid to the different cylinders may be controlled.

Assuming that this particular valve mechanism is designed for controlling one of the tail-centers 102, the casing 120 will be provided with cylindrical openings 121 having ports 122 and 123 to which the pipes 112 and 113 are connected. The openings 121 are also provided with ports 124 connected to a supply pipe 125 and with ports 126 connected to an exhaust pipe 127 or to atmosphere.

Piston valves 130 and 131 are slidable in the openings 121 and are provided with notched upward extensions 132, engaging projections 133 at opposite sides of an arm or lever 134, pivoted at 135 and extending upward therefrom.

A cross bar 136 has a pin and slot connection with the upper end of the lever 134, and the ends of the bar 136 are pivoted at 137 to plungers 138 and 139 slidable in solenoid coils 140 and 141.

When the coil 140 is energized, the plunger 138 will be drawn into the coil 140, shifting the arm 134 to the right and thus raising the piston valve 130 and lowering the piston valve 131. The pipe 113 will thus be connected to the fluid supply pipe 125 and the pipe 112 will be connected to the exhaust 127. If the solenoid 141 is energized, the connections will be reversed.

The limit of movement of the solenoid plungers and piston valves is determined by a stop lever 142, pivoted at 143 and having a pin and slot connection at its lower end to the upper end of the lever 134. The upper end of the stop lever 142 swings between adjustable stop screws 144, by which the movements of the solenoid plungers and piston valves may be adjusted and determined.

*Motor and tool slide control*

We have provided motors M (Fig. 1) for driving the work spindles 81 and have shown each motor as connected to its spindle through a friction clutch 145 and a belt or other driving connection 146.

A clutch-control member 147 is mounted to slide axially of the motor M but is at the same time held from rotation. Each member 147 is connected by a rocking lever 148 to a piston 149 slidable in a cylinder 150. Pipes 151 and 152 are connected to the opposite ends of the cylinder 150.

The member 147 supports a brake arm 153 which becomes operative to quickly bring the work spindle to rest when the member 147 is moved to disengage the clutch 145. The control connections are so arranged that the clutch will be disengaged and the brake applied whenever the work heads 15, 16 and 17 descend as will be hereinafter described.

One or more tool slides T are provided for each machine 10 and 11 and these tool slides may conveniently be actuated by pistons 154 slidable in cylinders 160 having pipes 161 and 162 connected at the opposite ends thereof and controlled by suitable cam or other mechanism not shown.

*Operation and automatic control*

Assuming that the gripper heads 60 are raised and that the work-heads or carriages 15, 16 and 17 are in their left-hand positions, as viewed in Figs. 1 and 2, the sequence of operations is as follows:

As the tool slides T complete their return movements, they close certain switches through which pressure fluid will be admitted to lower the work-heads, provided all of the work-heads are in their extreme left-hand positions. As the work-heads are lowered, the clutches 145 are disengaged and the spindle brakes 153 are applied.

The grippers 61 are then closed on the pieces of work W in the machines and also on a piece of work W in storage. The head and tail centers and drivers are then withdrawn, after which the gripper heads 60 are raised and the work-heads or carriages 15, 16 and 17 are shifted horizontally to the right.

The gripper heads are then lowered, the head and tail centers and drivers are advanced to operative positions, the grippers are opened, the gripper heads are raised, the brakes are released and the clutches are reengaged.

After the gripper heads are raised, the work-heads or carriages are returned to their left-hand or initial positions.

It is essential that all of these operations should be performed in a predetermined order, and that every movement or operation should be completed before the next movement or operation is started. This sequence of operations is accomplished by electrical control mechanism which will now be described.

Referring to Fig. 9, we have shown line or supply wires L and L$^1$. Branch wires A, B, C, D, E, G, H and J extend to certain switches and control devices, and return wires AX, BX, CX, DX, EX, GX, HX and JX complete the branch circuits.

Switches A$^1$, A$^2$, A$^3$, A$^4$ and A$^5$ and a solenoid coil A$^6$ are mounted in series in the circuit formed by the branch wires A and AX. The switch A$^1$ (Fig. 1) is closed by a plate 165 when the tool slide T of the machine 11 completes its return movement. The switch A$^2$ is similarly closed when the tool slide T of the machine 10 completes its return movement. The switch A$^3$ is closed by a plate 166 when the work-head 15 reaches its extreme left-hand position. The switches A$^4$ and A$^5$ are similarly closed when the work-heads 16 and 17 reach their extreme left-hand positions.

As these switches are all in series, it is necessary that all of the switches be closed before current can flow through the solenoid coil A$^6$ which forms an actuating element of a valve mechanism A$^7$, which in turn controls the admission of pressure fluid to the work-head cylinders 50 and to the clutch and brake cylinders 150.

The closing of all of the switches in the A circuit causes the valve mechanism A$^7$ to be shifted to admit pressure fluid to the upper ends of the cylinders 50 and 150 through the pipes 53 and 151, thus depressing the heads 15, 16 and 17, stopping the spindles 81, and applying the spindle brakes 153 in the machines 10 and 11.

Switches B$^1$, B$^2$ and B$^3$ and a solenoid coil B$^6$ are located in series in a circuit formed by the branch wires B and BX. The switches B$^1$, B$^2$ and B$^3$ are mounted on the cross-heads 57 which support the gripper heads 60. These switches are closed by engagement with contact plates 167 mounted on brackets secured to the fixed guide-ways 20 of the work-handling mechanism.

Consequently the B circuit is closed when the downward movement of the gripper-heads 60, occasioned by the closing of the A circuit, is completed.

When the B circuit is closed, the solenoid coil $B^6$ is energized to shift a valve mechanism $B^7$ so as to admit pressure fluid through the pipe 71 to the cylinders 70 in the gripper heads 60, thus closing the grippers 61 on the pieces of work W in the machines 10 and 11 and also on a piece of work W in storage.

A series of switches $C^1$, $C^2$ and $C^3$ and a solenoid $C^6$ are mounted in series in the circuit formed by the branch wires C and CX. The switches $C^1$, $C^2$ and $C^3$ are mounted on brackets on the sides of the gripper-heads 60 and are closed by engagement by contact plates 168 on the upward extensions of one of each pair of grippers 61. Consequently the C circuit is closed when all of the grippers have been moved to work-engaging position.

Closing of the C circuit energizes the solenoid coil $C^6$ and shifts a valve mechanism $C^7$ to admit pressure fluid through the pipes 113 to the tail-stock cylinders 110, thus withdrawing the tail-centers 102. At the same time, the valve mechanism $C^7$ connects the pipes 97 to the exhaust, permitting their head-centers and drivers to be withdrawn by their springs 94. The return sides of the tail-stock cylinders 110 are also connected through branch pipes 112 to the pipe 97 and thence to the exhaust.

A series of switches $D^1$, $D^2$, $D^3$ and $D^4$ and a solenoid coil $D^6$ are mounted in the branch circuit formed by the wires D and DX. The switches $D^1$ and $D^3$ are arranged to be closed by plates 169 as the head-centers and drivers are withdrawn and the switches $D^2$ and $D^4$ are arranged to be closed by plates 170 as the tail-centers 102 are withdrawn.

When all of these switches are closed, the solenoid coil $D^6$ is energized. This solenoid coil is associated with the valve mechanism $A^7$ and acts in a reverse direction to the coil $A^6$ previously described. Consequently, completion of the D circuit causes the valve mechanism $A^7$ to be reversed, admitting pressure fluid to the pipes 52 connected to the lower ends of the work-head cylinders 50 and thus raising the work-heads with the grippers 60 closed on the several pieces of work W.

A series of switches $E^1$, $E^2$ and $E^3$ and a solenoid coil $E^6$ are mounted in series in a branch circuit formed by the wires E and EX. These switches $E^1$, $E^2$ and $E^3$ are mounted in fixed position and may be closed by contact plates 172 mounted on rocking arms 173 and having pivoted depending lifter members 174 engageable by abutments 175 on the cross-heads 57.

When the work-heads or carriages 15, 16 and 17 are shifted to the left, with the gripper-heads in raised position, the abutments 175 push the lifter members 174 sidewise without closing the switches $E^1$, $E^2$ and $E^3$. When the heads 60 descend to grip the work, the members 174 swing back to vertical position, and when the heads are again raised, the abutments 175 engage the lower ends of the members 174, raising the contact plates 172 and thus closing the switches $E^1$, $E^2$ and $E^3$.

This causes current to flow through the solenoid coil $E^6$, which thereupon shifts a valve mechanism $E^7$ to admit pressure fluid through the pipe 41 to the left-hand end of the main cylinder 25, thus actuating the pull rod 38 and shifting the work-heads or carriages 15, 16 and 17 to their right-hand operative positions, with the heads 15 and 16 over the machines 10 and 11, and with the head 17 over the discharge runway 13.

A series of switches $F^1$, $F^2$ and $F^3$ are arranged in series in a sub-circuit formed by branch wires F and FX, this branch circuit being in parallel with that part of the A circuit which contains the switches $A^1$, $A^2$, $A^3$, $A^4$ and $A^5$. The F circuit thus jointly controls the solenoid coil $A^6$ previously described.

The switches $F^1$, $F^2$ and $F^3$ are engaged by contact plates 180 on the heads 17, 16 and 15 respectively, as these heads reach their extreme right-hand positions. Closing of the F circuit causes the solenoid coil $A^6$ to be again energized, shifting the valve mechanism $A^7$ to again admit pressure fluid through the pipes 53 to the upper ends of the cylinders 50, thereby lowering the gripper heads as previously described.

Switches $G^1$, $G^2$ and $G^3$ and a solenoid coil $G^6$ the mounted in series in a branch circuit G which is cut in on the wires B and BX but which operates independently of the circuit B. The switches $G^1$, $G^2$ and $G^3$ are single pole switches, with one terminal of each switch mounted in fixed position on the guide-ways 20 and with the other terminal of the switches $G^1$ and $G^2$ mounted on lateral extensions of the cross-heads 57 associated with the carriages 15 and 16. The single terminal of the switch $G^3$ engages the right-hand contact only of the switch $B^1$ previously described.

The switches $G^1$, $G^2$ and $G^3$ are closed in series when the cross bars 57 and gripper-heads 60 descend, but only if the work-heads or carriages 15, 16 and 17 are also in their extreme right-hand positions. The circuit being thus closed through the solenoid coil $G^6$, the valve mechanism $C^7$ is reversed and admits pressure fluid to the pipes 97 and to the branch pipes 112 to advance the head and tail-centers and drivers to operative positions.

Switches $H^1$, $H^2$, $H^3$ and $H^4$ and a solenoid coil $H^6$ are mounted in series in a circuit formed by the branch wires H and HX. The wire H is tapped in on the branch wire D and the wire HX is tapped in on the branch wire DX, being connected at such points that the switches $H^1$, $H^2$, $H^3$ and $H^4$ and the solenoid $H^6$ are in parallel with the switches $D^1$, $D^2$, $D^3$ and $D^4$ but are in series with the solenoid coil $D^6$.

The switches $H^1$ and $H^3$ are arranged to be closed by the contact plates 169 previously described, when the head-centers and drivers are moved to operative position, and the switches $H^2$ and $H^4$ are arranged to be similarly closed by plates 177 when the tail-centers are moved to operative position.

When all of these switches are closed, the coil $H^6$ is energized, reversing the valve mechanism $B^7$ and connecting the pipes 71 to the exhaust, permitting the springs 67 in the gripper heads 60 to raise the pistons 68, and thus allowing the grippers to be opened by the springs 63. At the same time, the solenoid coil $D^6$ is energized, being in series with the H circuit, and shifts the valve mechanism $A^7$ to admit pressure fluid to the pipes 52 to raise the gripper-heads.

A series of switches $J^1$, $J^2$, $J^3$ and a solenoid $J^6$ are mounted in series in a circuit formed by the branch wires J and JX. These switches $J^1$, $J^2$ and $J^3$ are mounted in fixed positions and are closed by contact plates 184 having depending swinging arms 185 which are pushed aside by the abutments 175 as they move to the right, but which are engaged and lifted by direct upward movement of the abutments with the gripper-heads after release of the work.

Closing of the switches $J^1$, $J^2$ and $J^3$ energizes the solenoid coil $J^6$, which reverses the valve mechanism $E^7$, admitting pressure fluid through the pipe 40 to the right-hand end of the main cylinder 25 and thus shifting the work carriages to the left to their initial positions.

At this time the A circuit is open at the switches $A^1$ and $A^2$ by reason of the fact that the tool slides are making their operative strokes. When the operations are completed and the tool slides return to close the switches $A^1$ and $A^2$, the cycle of loading operations and associated machine movements will recommence.

The several valve mechanisms as $A^7$, $B^7$, etc. are of the general construction shown in Fig. 7 and are shown in Fig. 8 as assembled in a valve box X having supply and exhaust connections Y and Z.

It will thus be seen that we have so co-related the various parts of our work-handling mechanism, machines, and control-circuits, that each operation depends upon completion of the previous operation or movement by each one of the machines or devices in the combination.

Thus if one of the gripper heads does not move downward to its lowest position, the B circuit will remain open and no further work-handling operations will take place until this difficulty is remedied.

Similarly, if one of the grippers fails to close on the work, the C circuit will remain open and the head and tail-centers will not be withdrawn from the work. If the centers are not all withdrawn, the D circuit remains open and the gripper-heads will not be raised. Similarly through each of the steps of the control the failure of any part to move as predetermined will prevent further operation of the work-handling mechanism.

In order to prevent the solenoid coil $A^6$ from opposing the subsequent action of the solenoid coil $D^6$, special provision has been made for opening the A circuit before the D circuit is closed.

Referring to Fig. 1, we have provided a switch $A^8$ in the A circuit adjacent the coil $A^6$ and normally closed by a plate 190. As the solenoid plunger in the coil $A^6$ is moved to the right in Fig. 1, the upper end of the three-armed lever of the valve mechanism $A^7$ strikes the bell crank 191 near the limit of its stroke and raises the plate 190, thus opening the A circuit. Consequently, when the D circuit is thereafter energized, the coil $D^6$ is permitted to reverse the valve mechanism $A^7$ and raise the gripper-heads 60.

It is necessary, however, for the switch $A^8$ to be thereafter closed in order that the F circuit may be effective to again lower the gripper-heads in their right-hand positions. Consequently we provide a V-shaped cam projection 192 on the work-carriage 16, which engages a corresponding cam projection 193 on the bell-crank 191 and forces the plate 190 downward as the carriage 16 moves to the right. The lug 192 passes beyond the projection 193, however, so that the switch $A^8$ may be again opened when the plunger is shifted to the right on the closing of the F circuit. It is then possible for the coil $D^6$ to operate as previously described when the H circuit is closed, again shifting the valve mechanism $A^7$ and causing the gripper-heads to be raised for the second time.

As the carriages are thereafter returned to their left-hand positions, the projection 192 will again close the switch $A^8$, thus restoring the A circuit to its original condition, ready for another cycle of operations.

Somewhat similar provision has been made to prevent the coil $C^6$ from opposing the action of the coil $G^6$. A supplementary switch $C^9$ (Fig. 1) is inserted in the C circuit adjacent the coil $C^6$ and is normally closed by a plate 200 mounted on a bell-crank 201 and engaged by the upper end of the three-armed lever which controls the valve mechanism $C^7$. As the solenoid plunger in the coil $C^6$ completes its movement to the right, the lever engages the bell-crank 201 and opens the switch $C^9$, thus permitting the solenoid $G^6$ to thereafter operate upon the closing of the G circuit and reverse the valve mechanism $C^7$.

It is necessary to provide means for then closing the switch $C^9$ so that the C circuit may be available for use in the next cycle of operations. For this purpose we provide a latch 202 mounted on an arm 203 extending downward from the gripper-head 60 associated with the work-carriage 15.

An upward extension of this latch is held yieldingly against a stop-pin 204 by a compression spring, and the lower end of the latch has a cam face engaging a corresponding cam projection 205 on an upward extension of the bell-crank 201.

As the gripper-heads descend on the closing of the A circuit, the latch 202 engages the cam projection 205 and closes the switch $C^9$. It will be noted, however, that the latch 202 yields as it passes the projection 205 in its upward movement, so that as the heads are later raised, after the closing of the C circuit and the subsequent opening of the switch $C^9$, the C circuit will be left open, so that the G circuit may operate.

We thus provide for a plurality of successive automatic movements of the work-handling mechanism and of certain associated machine parts, and we also provide means to prevent any control circuit remaining closed after operation thereof, if a closed condition of said circuit would prevent effective operation of any other control circuit thereafter energized.

By the arrangement of mechanism and the successive automatic operation of parts herein described, we provide for automatically feeding pieces of work to the first of a plurality of machine tools, for successively advancing pieces of work to successive tools, and for removing the finished work from the last of the machine tools. Furthermore, as the rotation of the work is stopped before the grippers engage the work, the mechanism is adapted for handling irregular or non-cylindrical pieces of work as well as for handling irregular or non-cylindrical pieces of work as well as for handling regular cylindrical work such as piston blanks.

Having thus described our invention and the advantages thereof, we do not wish to be limited to the details herein disclosed, otherwise than as set forth in the claims, but what we claim is:—

1. A plurality of machines effective to operate successively on a piece of work, work handling mechanism for feeding work to each of said machines and for removing work therefrom, and control devices operatively interlocking the work handling mechanism and machines whereby the operation of the work handling mechanism for all of said machines is prevented until every machine has completed its operation on the work mounted therein.

2. Work handling mechanism for a plurality of machines effective to operate successively on a piece of work, said mechanism comprising a plurality of work-handling devices, one for each machine and each operative in successive steps, and control devices operatively interlocking said work handling devices whereby to initiate each successive step in the operation of said work-handling devices collectively upon completion of the preceding operation by all of said work-handling devices and effective to otherwise prevent such initiation.

3. Work handling mechanism for a plurality of machines effective to operate successively on a piece of work, said mechanism comprising a plurality of work handling devices, one for each machine and each operative in successive steps, and control devices operatively interlocking the work handling mechanism and machines whereby an incomplete movement of any one of said work-handling devices prevents all further operation of said work handling mechanism until said incomplete movement is completed.

4. In a work-handling mechanism, a plurality of heads supporting work-engaging devices, means to raise and lower said heads, means to actuate said work-engaging devices, and means operatively interlocking said heads and work engaging devices whereby actuation of said work-engaging devices is prevented when any one of said heads is out of extreme lowered position.

5. In a work-handling mechanism, a plurality of heads supporting work-engaging devices, means to raise and lower said heads, means to shift said heads laterally, and means operatively interlocking said heads and work engaging devices whereby lateral shifting movement of said heads is prevented when any one of said heads is out of fully raised position.

6. In a work-handling mechanism, a plurality of heads supporting work-engaging devices, means to raise and lower said heads, means to shift said heads laterally, and means operatively interlocking said heads and work engaging devices whereby lowering of said heads is prevented unless all of said heads are collectively in their extreme right-hand positions or are collectively in their extreme left-hand positions.

7. In a machine tool, means to support and rotate a piece of work therein, a work-handling mechanism comprising a head having work-engaging devices mounted thereon, means to raise and lower said head, means to shift said head laterally, means to render said work-engaging devices operative and inoperative, and control devices operatively interlocking the raising and lowering means, the shifting means and the means controlling the work-engaging devices and effective to render the respective means automatically operative in predetermined order.

8. In a machine tool, means to support and rotate a piece of work therein, a work-handling mechanism comprising a head having work-engaging devices mounted thereon, means to raise and lower said head, means to shift said head laterally, means to render said work-engaging devices operative and inoperative, and control devices operatively interlocking the raising and lowering means, the shifting means and the means controlling the work-engaging devices and effective to render the respective means automatically operative in predetermined order and effective also to prevent operation of each means until the operation of the preceding means is completed.

9. A work-handling mechanism for machine tools comprising a plurality of devices for effecting different predetermined movements of said mechanism, means to actuate said devices, a plurality of electric control circuits for said devices, supplementary means to open a certain circuit after operation thereof, thereby preventing interference with the operation of the mechanism controlled by a certain other circuit thereafter rendered operative, and means to thereafter restore said first circuit to operative condition.

10. A machine tool having a work spindle, a work-handling mechanism, automatic means to stop said spindle, automatic means to effect engagement of said work-handling mechanism with a piece of work supported by said spindle, and devices effective to cause said first and second means to operate successively and in the stated order.

11. In a work-handling mechanism for machine tools, a plurality of work-supporting carriages, fixed guide-ways for said carriages, and a single actuating device having lost motion connections to certain carriages and effective by a single continued movement to move different carriages different distances along said guide-ways.

12. In a work-handling mechanism for machine tools, a plurality of work-supporting carriages, fixed guide-ways for said carriages, a single actuating device having lost motion connections to certain carriages and effective by a single continued movement to move different carriages different distances along said guide-ways, and means to stop each carriage in predetermined position at each end of its path of travel.

EDWIN R. SMITH.
ALBERT SCHINKEZ.